United States Patent [19]

Wildt

[11] 3,726,700

[45] Apr. 10, 1973

[54] COMPOSITE PIGMENTS AND THEIR PREPARATION

[75] Inventor: Hans A. Wildt, Wilmington, Del.

[73] Assignee: E. I. Du Pont De Nemours and Company, Wilmington, Del.

[22] Filed: Mar. 19, 1971

[21] Appl. No.: 126,364

[52] U.S. Cl. .............................. 106/300, 106/308 B
[51] Int. Cl. ............................................... C09c 1/36
[58] Field of Search .......................... 106/300, 308 B

[56] References Cited

UNITED STATES PATENTS

| | | | |
|---|---|---|---|
| 2,176,877 | 10/1939 | Alessandroni | 106/308 B |
| 2,387,534 | 10/1945 | Seidel | 106/308 B |
| 2,296,636 | 9/1942 | Hanahan | 106/308 B |
| 3,453,131 | 7/1969 | Fadner | 106/300 |

*Primary Examiner*—James E. Poer
*Attorney*—Donald A. Hoes

[57] ABSTRACT

Composite pigments, exhibiting high hiding power when incorporated into latex paints, are formed of a mineral extender comprising clay particles to which pigmentary titanium dioxide particles have been adhered by a precipitate of 1–15 percent by weight of hydrous oxides of titanium, aluminum, or silicon or mixtures thereof. The clay particles comprising the extender are preferably those derived from high kaolinite clays, or calcined or delaminated clays having an internal pore volume in the dry, compressed form of at least 0.3 $cm^3/gm$ and an internal pore size distribution between 1.5 and 0.2 microns.

8 Claims, No Drawings

COMPOSITE PIGMENTS AND THEIR PREPARATION

BACKGROUND OF THE INVENTION

The use of inexpensive particulate materials such as purified clays and calcium carbonate to confer desired properties such as increased opacity to paints and paper has been common practice for many years. Because of the low refractive indices and particle sizes too large for optimum light scattering, their use as opacifiers and brighteners has been generally confined to those systems which are fairly porous and low in binder such as flat paints, paper coatings and addition to paper pulp for inclusion in paper sheets. In these systems air-pigment interfaces predominate sufficiently to confer substantial opacity by virtue of the differences in refractive index between air and pigment.

Various methods for improving the opacity of films containing these pigments by increasing the porosity of the film are known to those skilled in the art. Among these are surface treatment with a porous coating of hydrous oxides such as taught in U.S. Pat. Nos. 2,296,637 and 2,231,468. Such methods, however, are limited by the adverse effects on film properties such as abrasion resistance, tensile strength, and adhesion because of the adsorption of the binder in the pores on the pigment surfaces and consequent reduction of the amount of binder available for adhering the pigment particles to each other and to the substrate.

In systems such as latex and alkyd flat paints, where substantial quantities of binder must be used to obtain good film integrity, the desired opacity must be gained at usable film thicknesses by the more costly pigments of high refractive index such as titanium dioxide. This is also practiced with low binder systems such as paper coatings, where it is desired to reduce the coating thickness and sheet weight and still maintain the required opacity and brightness.

Although titanium dioxide additions to coating systems containing pigments and fillers of low refractive indices substantially improve the opacities of those systems, the degree of improvement is dependent on several factors, one of the most important being the spacing of the $TiO_2$ in the final coating. The optimum spacing to give the greatest efficiency of light scattering per $TiO_2$ particle is generally considered to be one half the wave length of light, or 0.20–0.25 microns. However, in the interest of obtaining higher total opacity of the system, it may be necessary to sacrifice light-scattering efficiency by closer spacing than optimum by addition of more $TiO_2$. At a $TiO_2$ volume concentration of about 30 percent, further additions no longer increase the total opacity because of a rapid rate of decrease of opacity with increased crowding.

In coating systems involving mixtures of pigments and fillers of widely differing particle sizes and differing colloidal changes, the exact requirements for obtaining good pigment spacing are difficult to determine. It is well known that addition of submicron size particles of a less costly pigment of low refractive index sometimes increases the scattering efficiency of $TiO_2$ particles therein, but the conditions for obtaining this improvement must be determined by time-consuming trial and error methods. Even if good dispersion is obtained in the liquid formulation such as latex paints, factors operating during the drying may act to preferentially agglomerate like particles of $TiO_2$, to the detriment of proper spacing. This has been shown in the comparison of freeze-dried vs. normally dried latex paints, with the former exhibiting much higher opacities.

It would be advantageous, therefore, if the titanium dioxide could be affixed to the inexpensive extender in such a manner that the optimum spacing could be maintained throughout the various processes of paint preparation, pigment dispersion and drying. Numerous factors influence the choice of a suitable extender, not the least of which are particle size and shape as well as commercial availability at a reasonable cost.

A process for affixing pigment particles of colloidal size to particles of a non-swelling clay by coupling with organic acids is described in Fadner U.S. Pat. No. 3,453,131 but there is no suggestion that in using $TiO_2$ as the pigment it is possible to achieve a composite pigment of outstanding superiority in terms of light scattering efficiency.

SUMMARY OF THE INVENTION

It has been discovered that a composite pigment exhibiting high hiding power when incorporated into latex paints can be prepared by adhering particles of pigmentary titanium dioxide to a mineral extender comprising particles of high kaolinite clay, preferably a calcined or delaminated clay product. The adherence is achieved by a precipitate of 1 to 15 percent by weight, based on $TiO_2$ plus extender, of hydrous oxides of aluminum, silicon or titanium or mixtures thereof, followed by filtration, washing and fluid energy milling of the dried filter cake.

The invention is especially applicable to mixtures of untreated pigmentary titanium oxide — otherwise referred to as cooler discharge — obtained from the vapor-phase oxidation of titanium tetrachloride and containing up to 5 percent co-oxidized alumina, and to certain high kaolinite clays or, more preferably, calcined or delaminated clays having an internal pore structure of greater than 0.3 $cm^3/gm$ and a diameter between 0.2 to 1.5 microns, as measured in the dry cake by mercury porosimeter. Substantial improvements in opacity are exhibited by these products in latex paints and paper coatings as compared to the untreated, mechanical mixtures of the same particles. These improvements are obtained regardless of the nature of the hydrous oxides, the level of hydrous oxide addition or the method of precipitation although these variables do affect the magnitude of the improvements in opacity and film integrity of the resultant paint films. Precipitation of from 3–10 percent by weight of mixed hydrous oxides of alumina and silica, based on the weight of clay-$TiO_2$ mixtures, are favored for a product to be used in latex paints since it gives the best balance of high opacity and good film properties. Where high opacity is the objective as in paper coatings, this is achieved by a product utilizing a precipitate of 3–10 percent by weight silica as the hydrous oxide. With regard to the latter, a small amount (0.1–0.5 percent by weight) of alumina may also be precipitated to improve filterability.

As sources of the hydrous oxides, a solution of alum or sodium aluminate can be used for alumina; a solution of a soluble silicate, preferably sodium silicate, is useful for silica; and $TiCl_4$ or a solution of titanyl sulfate is useful for the titania. Precipitation may be effected from the acid or basic side, depending on the nature and amount of treating agent added. In the former case sodium hydroxide or ammonia may be used to precipitate the hydrous oxides, and in the latter case sulfuric or hydrochloric acids are favored. A typical procedure for preparing a composite pigment would involve the following steps:

1. Titanium dioxide cooler discharge and the selected clay in the desired proportions are slurried in water at 100–300 g/l of total solids.
2. While vigorously agitating the slurry, a solution of sodium silicate (400 g/l $SiO_2$) is added to the slurry in an amount necessary to give the desired weight percent of $SiO_2$, based on total pigment solids.
3. A solution of aluminum sulfate (100 g/l $Al_2O_3$) is added in sufficient quantity to give the desired proportion of $Al_2O_3$.
4. The slurry is, optionally, then heated to 50°–70°C.
5. Since the pH is usually less than 5 at this point, sodium hydroxide is added to the agitated slurry until the pH reaches 7.8–8.3.
6. After digestion for 30–60 minutes, with occasional additions of acid for pH adjustments, the slurry is filtered, washed, dried and fluid energy milled.

That the product thus obtained consists of particles of $TiO_2$ which are dispersed on, and adhered to, the larger clay particles is shown by the lack of selective sedimentation when dispersed in water, the unchanged composition after fluid energy milling, and the markedly improved hiding power conferred to latex paints when compared to a mechanical mixture of equivalent $TiO_2$-clay composition.

PREFERRED EMBODIMENTS

Basic Ingredients

Ideally the mineral extender acting as a $TiO_2$ spacer should be comprised of laminar clay particles on the order of 0.1 micron thickness and rather large lateral dimensions. Practically, the commercial products of moderate cost that are preferred are the purified high kaolinite clays or the aluminum silicate pigments derived from such clays by certain classification procedures. More preferable are certain anhydrous or calcined high kaolinite clays since, as a result of their production, the lattice layers have been loosened such that the product is more easily delaminated to give greater surface area available for adhering the $TiO_2$ particles.

Because of the large number of clay derived pigments whose particulate composition depends on the source and method of processing, and the broad ranges of particle sizes and shapes contained in a single product, selection of extender on the basis of particle size distribution is impractical. It has been discovered that this selection can be greatly facilitated by the procedure of determining the pore size distribution of the dry powder with the mercury porosimeter. It has been further discovered that those pigments with preponderantly laminar particles whose pore size distribution occurs predominantly within the range of 1.5 to 0.2 microns in diameter, and more preferably between 0.8 and 0.2 microns in diameter as measured by the porosimeter are the most advantageous for use in the preparation of composite pigments. It has further been found that the advantage is proportional to the total volume of pores within the preferred size range. To be commercially attractive, the internal pore volume should be at least 0.3 $cm^3/gm$ of pores within the preferred size range. It would appear that this type of pore structure indicates a rather large surface area available for adherence of $TiO_2$ particles in a dispersed condition while still retaining sufficient porosity after treatment to give appreciable areas of air-$TiO_2$ interfaces.

In the following table, some examples are given of commercial clay-derived products which are useful for composite pigments. These are arranged in order of decreasing performance and it can be seen that this is a function of the porosity and pore size distribution. This list is only representative and is not intended to be limiting.

TABLE I

| Product and source | description | internal pore size microns | internal pore vol. cc/gm | hiding Power Composite Pigment |
|---|---|---|---|---|
| Satintone No. 4 of Engelhard Min. & Chem. Corp. | calcined clay | 0.2–0.4 | 0.64 | very high |
| Satintone No. 1 of Engelhard Min. & Chem. Corp. | calcined clay | 0.2–0.6 | 0.44 | high |
| Icekap K of Burgess Pigment Co. | calcined clay | 0.5–1.2 | 0.80 | moderate |
| ASP 400 of Engelhard | Hydrous alum. silicate | 0.9–1.5 | 0.24 | low |

Although advantageously the entire mineral extender content is clay, other mineral fillers may be substituted for a part of the clay. Thus up to 70 percent by weight of the mineral extender may be one or more other typical materials such as calcium carbonate, diatomaceous earth, and asbestine.

The titanium dioxide pigment preferred is the cooler discharge in the rutile form obtained from the vapor phase oxidation of titanium tetrachloride, although the ball-milled kiln discharge from the sulfate process, either in the rutile or anatase form may be used. In addition to being less costly than surface-treated and finished grades of $TiO_2$, the cooler discharge is advantageous because the particles tend to be positively charged by virtue of residual adsorbed hydrochloric acid, hence tend to be more readily adsorbed in a dispersed condition on the larger clay particles which are usually negatively charged.

Composition of Composite Pigment

The percentage of $TiO_2$ in the composite pigment may range from 3 to 50 percent by weight. Below 3 percent the incremental addition to the total opacity of the mixture is too small to be economically advantageous. Above 50 percent the crowding of $TiO_2$ particles reduces the opacity increase with further incremental additions of $TiO_2$ to an unacceptable level. The level of $TiO_2$ can be selected according to the particular end-use contemplated. Composite pigments with low $TiO_2$ levels are more suitable for paper coatings. High $TiO_2$ concentrations are preferred for latex paints. Composite pigments containing 42 percent by weight of TiO$_2$ have been selected for evaluation to give direct comparison with an equal weight TiO$_2$-extender composition contained in a standard commercial latex paint formulation, thus avoiding other complications such as differing pigment to binder ratios.

Surface Treatments

Advantages in hiding power can be obtained with composite pigments prepared by precipitation of the hydrous oxides of titanium, silicon and aluminum, either individually or in combination, and at levels of from 1–15 percent total oxides by weight based on the TiO$_2$-mineral extender mixture. Mixtures of the hydrous oxide of alumina and silica are favored as giving composite pigments with the best combination of high opacity and good film integrity in latex paints, although silica alone gives the highest opacity.

Composite pigment opacity is increased with increasing levels up to 15 percent by weight of the oxides or hydrous oxides based on the total pigment weight but the increase at the higher levels are obtained at the expense of loss in film properties of the latex paints prepared therefrom. The particular procedures and reagents used for precipitation of the hydrous oxides appear to have less influence on composite pigment performance than the amounts of hydrous oxides precipitated. A preferred range is 3–10 percent by weight of hydrous oxide.

The Product

The washed and dried composite pigment can be fluid energy milled at high rates and relatively low steam to pigment ratios without affecting the composition. The pore size distribution of the dried composite pigment occurs at lower size ranges than the original extender indicating some filling of the pores by TiO$_2$ particles and hydrous oxide. Sufficient porosity remains, however, to furnish appreciable air-TiO$_2$ interfaces. A laminar extender exhibiting a porosity in the 0.4–0.6 micron range, when processed to a composite pigment by the process of this invention, exhibits a pore diameter in the range of 0.2–0.4 micron.

DESCRIPTIONS OF TESTS

Pore Size Determinations

Determinations of pore size distributions are made on both particulate solids and paint films by use of an Aminco No.5-7121-B Porosimeter (American Instrument Company, Silver Spring, Md.). This instrument functions on the well known principle that when mercury is forced into the pores of a porous solid material, the pressure necessary to fill the pores is inversely proportional to the pore diameter. The general relationship is expressed by the Washburn equation: $Pr = 2\phi \cos\theta$ Where P is the pressure, r is the pore radius, $\phi$ is the viscosity of the mercury and $\theta$ is the contact angle of mercury on a solid. For a value of 473 dynes/cm for the surface tension and an assumed contact angle of 130°, the equation reduces to:

$$D = 175/P$$

Where D is the pore diameter in microns and P is the absolute pressure in lbs./in$^2$. This is the relationship used in all calculations of pore diameter.

The experimental procedure followed is that described in Aminco instruction booklet No. 907-D using a No. 5-7173 Penetrometer Assembly. The data is obtained as a variation of cm.$^3$ of mercury penetration vs. the pressure. For a particulate solid of fairly narrow particle size distribution, the derivatives of the curves obtained ($dv/dp$) are usually bimodal, with one peak occurring at low pressures (large diameter pores) characteristic of surface or gross porosity which may be somewhat affected by the method of consolidating the powder, and a second peak occurring at higher pressures which reflects the inter-particle spacing and is quite characteristic of the specific particulate material measured. Although the latter peak is largely unaffected by the method of packing, a uniform method of handling powders was adopted which consists of slurrying the powder in water, drying to a relatively thick cake, and transferring a weighed portion of the cake to the penetrometer for measurement. This procedure minimizes the surface porosity effects and the volume of mercury penetration in the cake more closely represents the internal pore volume. The porosimeter indicates only those pores which are open to the outside surface of the sample and if large openings are connected by narrow channels, their volume will be indicated by the diameter of said channels. The pore sizes registered, therefore, more closely represent interparticle distances, but for packed powders nearly all of the pores are available to the mercury.

For measuring paint films, the technique is simple. A portion of film is scraped from the substrate with a razor blade, and a weighed portion is transferred to the penetrometer. Pore sizes are calculated from the pressures at which the peaks occur by means of the Washburn equation and can be expressed as a range of pore sizes encompassing the extremes of the distribution and/or a model pore size, where $dv/dp$ is a maximum. The porosity (cm$^3$/gm) is evaluated. The area under the peak is cm$^3$ divided by the weight of the sample.

EVALUATION OF COMPOSITE PIGMENTS

Preparation of Emulsion Paints

The composite pigments are evaluated for hiding power and other film properties by incorporating into the following latex paint formulation, substituting the composite pigment on an equal weight basis for combined weights of titanium dioxide and extender:

| | |
|---|---|
| Water | 275 gm |
| Anhydrous tetrapotassium pyrophosphate | 2 |
| Water soluble soya lecithium | 8 |
| Tergitol NPX (Union Carbide Co.) | 2 |
| Nopco NDW Antifoam (Nopco Chemical Co., Newark, N.J.) | 0.5 |
| Rutile titanium dioxide pigment | 200 |
| Extenders | 275 gm |

This mixture is ground in a 1-quart Cowles Mixer (2 inch blade) running at 2,000 rpm for 3–4 minutes. After the initial mixing the speed is increased to 3,000 rpm and further ground for 10 minutes. The batch is then reduced by mixing in the following:

| | |
|---|---|
| Methyl cellulose, 4,000 cps, 3½% solution | 120 gm |
| "Carbitol" acetate (Dow Chemical Co.) | 25 |
| "Elvacet" polyvinyl acetate emulsion (E.I. du Pont) | 224 |
| "Nopco" NDW | 0.5 |
| Water | 40 |

| | |
|---|---|
| Phenyl mercury acetate (Pigment Volume % = 60) | 0.3 |

Hiding Power

A film of prepared paint is drawn down on a glossy black and white striped paper chart (Morest-Form 09) using a Bird Applicator (Bird Machine Co. — East Walpole, Mass.) with a 3-mil clearance. Measurements of reflectivity of the film are made over black (Ro) and white (Rw) portions of the chart using a Gardner Automatic Multipurpose Reflectometer with a green filter. From these readings, and the measurement of reflectivity of the white portion of the chart not covered by the paint film (Rg) the hiding power of the film is calculated as a scattering power (SX) by the following Kubelka-Munk equations:

$$SX = (1/b) \, Ar \, ctgh \, [(1-a \, Ro)/b \, Ro]$$

where $$a = 1/2 \left( Rw + \frac{Ro - Rw + Rg}{Ro \, Rg} \right)$$

and $$b = (a^2 - 1)$$

Relative hiding power of the film is then expressed as follows:

$$\text{Relative hiding} = \frac{SX \text{ of sample paint}}{SX \text{ of standard paint}} \times 100$$

STAIN RESISTANCE

Films of the above paint are drawn down on glossy white paper with a Bird Applicator of 6 mil clearance, side by side with a paint made with the control formulation. A 2 inch strip across both dried films is flooded with a test ink (K & H Testing Compound of K & H Laboratories, Melrose, Park, Ill.). After 1½ minutes, the excess is wiped off and a visual comparison of the stains are made. This test is a measure of the porosity of the films. Ratings are made as follows:
+   better than standard
sl +   slightly better than standard
v sl +   very slightly better
v v sl +   very, very slightly better
=   equal to standard
−   poorer than standard

SCRUB RESISTANCE

Side by side films of a sample and control are placed on a glossy black chart in the manner described in the stain resistance test, and a slurry of 20 parts by weight of water and 50 parts of an abrasive, detergent cleansing powder is spread over a 2 inch wide strip across both films. A block brush, 3 × 1½ × ½ inches having stiff, black, butt-cut Chinese hog bristles is passed back and forth under moderate pressure across the two films. After 20 strokes, the chart is rotated 180° and the 20 strokes repeated. This procedure is repeated until both films fail as evidenced by show-through of the black background. This may occur for a greater or lesser number of strokes for the paint containing the pigment under evaluation as compared to the standard paint. The scrub resistance of the former is compared to the latter by a percentage $$\text{Scrub resistance} = \frac{\text{no. of strokes for sample}}{\text{no. of strokes for standard}} \times 100$$

COMPARISON A

This is intended to show the properties of a standard, commercial latex paint made with the formulation described previously, in which the extenders and titanium dioxide are incorporated as separate entities and mechanically mixed. In this preparation 200 grams of Ti-Pure R–931 titanium dioxide pigment (E. I. du Pont de Nemours & Co.) and 275 grams of extender consisting of 45 grams of Celite 281 diatomaceous silica (Johns-Manville Corp.) 130 grams of ASP–400 clays (Minerals & Chemicals Div. of Engelhard Corp.) and 100 grams of Camel-Tex precipitated calcium carbonate (R.T. Campbell Co., Towson, Maryland) are added to the grind base formulation, ground in the Cowles Mixer and reduced to the final paint formulation as described previously. This latex paint is then evaluated for hiding power and used as the control in all scrub resistance and stain resistance comparisons. The relative hiding power of this formulation is assigned a value of 100. Scrub resistance and stain resistance are considered standard.

COMPARISON B

This preparation serves as a basis for evaluating the basic ingredients of a preferred composition of composite pigments when incorporated in the standard latex paint formulation as a mechanical mixture.

The amounts of pigment and extender are the same as those used in Comparison A except that the titanium dioxide (200 gm) is a fluid energy milled cooler discharge obtained from the oxidation of titanium tetrachloride and contains 1 percent by weight co-oxidized alumina; and the extender (275 gms) is Satintone No. 4, a calcined clay selected for use because of its favorable pore size distribution. The latex paint prepared therefrom gives a relative hiding power of 163, a stain resistance equal to standard and a scrub resistance 60 percent of standard.

EXAMPLE I

This example is intended to illustrate the marked improvement in hiding power obtained when the pigments of Comparison B are treated by the process of the invention to obtain a composite pigment before incorporating into the latex paint formulation.

A slurry is formed by mixing 632 grams of titanium dioxide cooler discharge and 868 grams of Satintone No. 4 clay with 6 liters of water. While agitating vigorously, 178 grams of TiCl₄ are slowly added to the slurry, followed by 188 cc. of a sodium silicate solution containing 400 g/l of SiO₂. These are the quantities necessary to give 5% TiO₂ and 5% SiO₂ as the respective hydrous oxides based on the total weight of clay and TiO₂. The slurry, whose pH is now 3.7, is heated to 60°C. and 50% NaOH added slowly until a pH of 8.0 is reached. After digestion for 30 minutes, the slurry is filtered, washed, dried, and fluid energy milled.

A latex paint made according to the standard formulation with 475 grams of the above composite pigment, gives a paint with a relative hiding power of 239, despite the lower percentage of TiO₂ in the paint by virtue of the 10 percent of hydrous oxides present in the composite pigment. Stain resistance of the paint is vvsl + and scrub resistance is 58.

EXAMPLE II

In this example are shown the advantages of using mixtures of hydrous silica and alumina for preparation of the composite pigment in improving both hiding power and scrub resistance of the latex paint prepared therefrom.

A composite pigment is prepared by slurrying 632 grams of titanium dioxide pigment as cooler discharge, and 868 grams of Satintone No. 4 clay in 6 liters of water. To the agitated slurry are added 188 cc. of a solution of sodium silicate containing 400 g/l of $SiO_2$, followed by 750 cc. of a solution of aluminum sulfate (100 g/l $Al_2O_3$). The pH at this point is 4.3. After heating 60°C., a 50 percent caustic solution is added slowly to the agitated slurry, until a pH of 8.1 is obtained. After digestion for one hour, the slurry is filtered, washed free of salts, dried and fluid energy milled.

A latex paint is prepared according to the previously described formulation using 475 grams of the composite pigment thus obtained. Relative hiding power of the paint is 258, stain resistance is vvsl + and scrub resistance is 83 percent of standard.

EXAMPLE III

When the composite pigment is prepared by precipitation of only the hydrous oxide of silica, the greatest advantage in hiding power is obtained, although the scrub resistance of the paint is reduced somewhat over that obtained with the product of Example II.

A composite pigment is prepared by slurrying 632 grams of titanium dioxide cooler discharge and 868 grams of Satintone No. 4 in 6 liters of water. To the agitated slurry are added 375 cc of a solution of sodium silicate containing 400 g/l of $SiO_2$ to give 10 percent added $SiO_2$ as hydrous oxide. The pH of the slurry is 11 at this point.

A 50 percent solution of sulfuric acid is added slowly to the agitated slurry until a pH of 7.0 is reached. After digestion for 30 minutes the treated slurry is filtered, washed free of salts, dried and fluid energy milled.

A latex paint prepared with the standard formulation and 475 grams of the composite pigment gives a relative hiding power of 286. Stain resistance of the paint film is equal to the standard and the scrub resistance is 67.

Although latex paints prepared from the products of this invention, as set forth in the preceding examples are somewhat deficient in scrub resistance, only slight changes in formulation are necessary to improve the scrub resistance to standard levels or better. For example, by reducing the amount of composite pigment of Example II by 10 percent in the standard formulation, a latex paint is obtained which has a scrub resistance slightly better than standard and a relative hiding power that is still 230 percent of standard.

What is claimed is:

1. A composite pigment, exhibiting high opacity when incorporated into latex paints, formed of a mineral extender comprising clay particles to which there are adhered pigmentary titanium dioxide particles, said titanium dioxide particles being adhered to the mineral extender particles by a precipitated hydrous oxide of aluminum, silicon, titanium or mixtures thereof in an amount of 1 to 15 percent by weight based upon the total of said particles.

2. The pigment of claim 1 in which the mineral extender consists of a calcined or delaminated high kaolinite clay exhibiting an internal porosity in the dry form of at least 0.3 $cm^3$/gm consisting of pores of 0.2–1.5 microns in diameter.

3. The pigment of claim 2 in which pores are 0.2–0.8 micron in diameter.

4. The pigment of claim 1 in which 3–50 percent by weight thereof consists of pigmentary titanium dioxide cooler discharge containing up to 5 percent co-oxidized alumina as obtained from the vapor phase oxidation of titanium tetrachloride.

5. A method of preparing a composite pigment which confers high opacity to latex paints by the steps of:
   a. forming a water slurry of 100–300 grams per liter of total solids, of which 3–50 percent by weight are pigmentary titanium dioxide particles and 50 to 97 percent by weight is a mineral extender comprising clay particles;
   b. adding 1–15 percent by weight, based on said particles, of titania, alumina, silica or mixtures thereof as soluble salts to the aqueous slurry with agitation;
   c. adjusting the slurry pH to 7.8–8.3 with agitation;
   d. digesting the slurry for 15–60 minutes;
   e. filtering the slurry, washing it free of salts, and thereafter subjecting it to drying and fluid energy milling.

6. The process of claim 5 where the mineral extender consists of a high kaolinite calcined or delaminated clay with an internal porosity as measured in the dry form of at least 0.3 $cm^3$/gm consisting of pores 0.2–1.5 microns in diameter.

7. The process of claim 6 in which the pores are 0.2–0.8 microns in diameter.

8. The process of claim 5 wherein step (b) is effected by addition of an alkali metal silicate and a soluble salt of aluminum to provide, respectively, a precipitate of 3 to 10 percent silica and 0.1 to 5 percent alumina.

* * * * *